(No Model.)
S. G. EDWARDS.
SQUARE.
No. 590,215.　　　　　　　　　Patented Sept. 21, 1897.
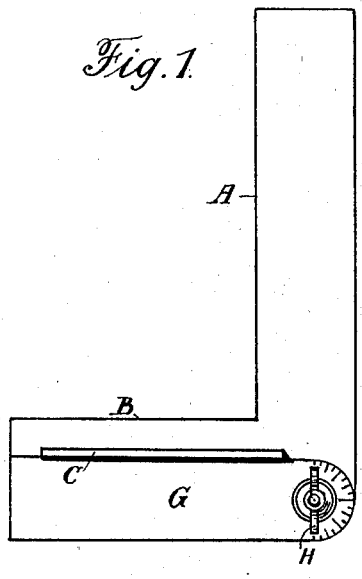
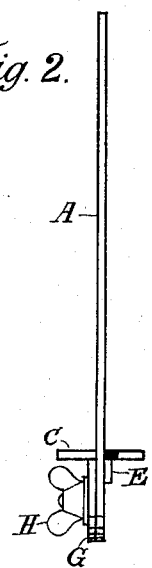
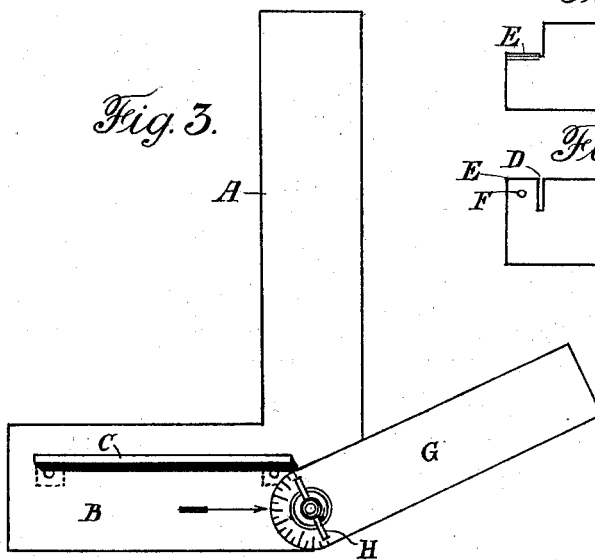
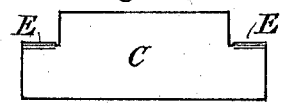
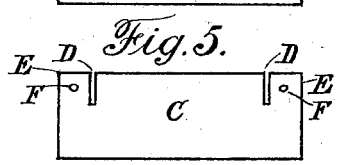
WITNESSES.　　　　　　　　　　　　　INVENTOR.

UNITED STATES PATENT OFFICE.

SYDNEY GEORGE EDWARDS, OF SHEFFIELD, ENGLAND.

SQUARE.

SPECIFICATION forming part of Letters Patent No. 590,215, dated September 21, 1897.

Application filed November 10, 1896. Serial No. 611,622. (No model.) Patented in England March 9, 1896, No. 5,238.

*To all whom it may concern:*

Be it known that I, SYDNEY GEORGE EDWARDS, a subject of the Queen of Great Britain, residing at Sheffield, in the county of York, England, have invented certain new and useful Improvements in the Construction of Metal Squares; and I do hereby declare the following to be a full, clear, and exact description thereof, reference being had to the accompanying drawings, which form a part of this specification.

A patent has been granted in England, No. 5,238, dated March 9, 1896.

My invention relates to the construction of metallic squares for the use of artisans and others, being intended to replace and supersede squares which are made with a thin metal blade secured to a wood block, and which are very liable to get out of truth.

In the annexed drawings I have shown a square made according to my invention, having an adjustable angle-piece.

Figure 1 represents the square with the angle-piece closed; Fig. 2, an edge view of same; Fig. 3, the same square with the angle-piece open; Figs. 4 and 5, two views of the rectangular facing.

I cut out from sheet metal, preferably using steel, the two arms A and B in one continuous piece, but in large sizes I may make them separately and either weld or otherwise join them together. In the part B, I cut out a narrow slot of a size suited to receive a head-bearing plate C, shown separately in Figs. 4 and 5, the edges being seen in Figs. 1, 2, and 3, and which forms a rectangular flange projecting from both sides of the part B, which is adapted to be brought to bear against a surface with which another line or surface is to be placed at an angle, and which is measured by the part A. This strip of metal C is slit at D, half-way across, and the two bits E are bent down, as seen in Fig. 4, to lie flat against the side of the part B, when the strip is passed into the slot. They are prepared with holes F and are permanently fastened to the part B by screws or rivets. To render this instrument still more useful for some purposes, I also add thereto, when desired, an adjustable blade or angle-piece G, which may be fixed at any desired angle by means of the winged nut H. I make this blade of such proportions that it will close under and lie against the part C, as in Fig. 1, and upon its circular end I mark various indications of useful angles. I may also mark the parts A and B with any desired divisions for measurement.

Having now described my invention, what I wish to claim is—

1. In combination with the square slotted in one of its parts or members, the bearing-head extending through said slot having tongues or projections clamped over to hold the strip in place, substantially as described.

2. In combination with a square, slotted in one of its parts or members, the bearing-head passed half-way through the slot, and means for holding said bearing-head against displacement in the slot, substantially as described.

3. In combination with a square slotted in one of its parts or members, the bearing-head inserted in said slot, turned over tongues or projections on said head, and rivets securing said projections to the square, substantially as described.

In testimony that I claim the foregoing as my own I have affixed hereto my signature, in presence of two witnesses, this 28th day of October, 1896.

SYDNEY GEORGE EDWARDS.

Witnesses:
ROBT. F. DRURY,
BERNARD E. DRURY.